Jan. 3, 1939.    F. C. WAGNER    2,142,466
VARIABLE CLEARANCE VOLUME ENGINE
Original Filed Jan. 7, 1935    6 Sheets-Sheet 3
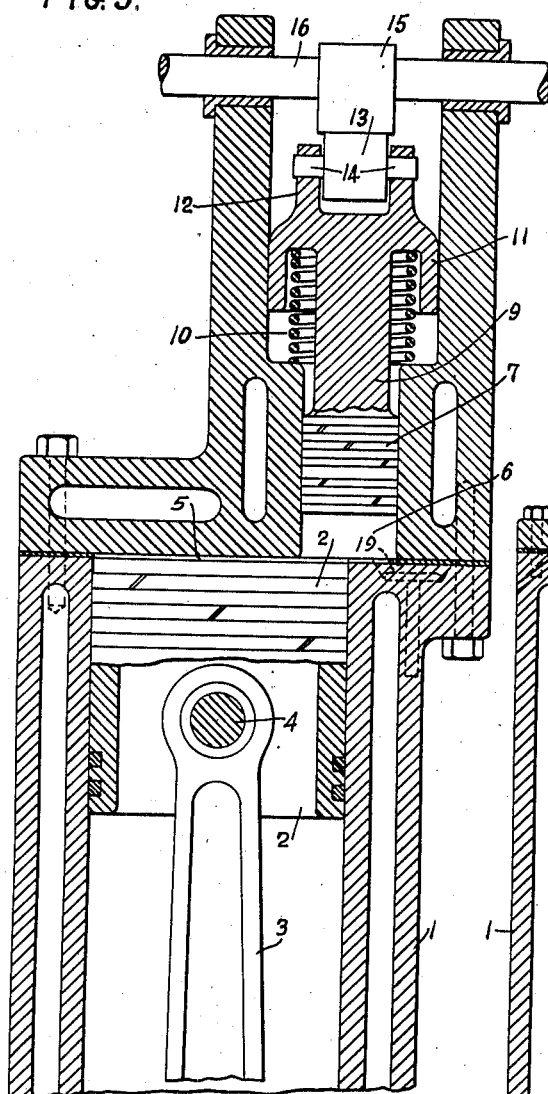
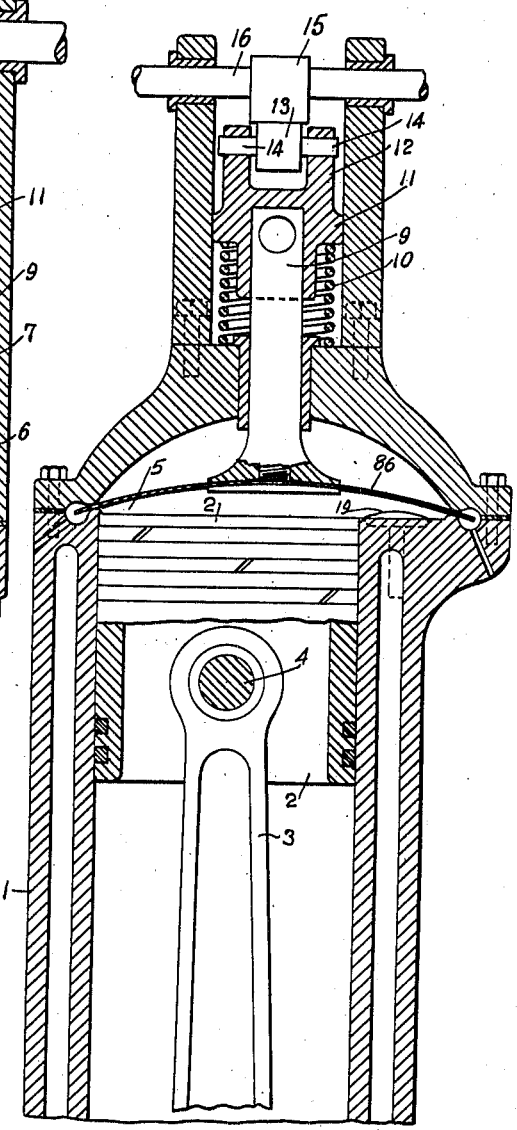
FRANK C. WAGNER, Inventor Jan. 3, 1939.   F. C. WAGNER   2,142,466
VARIABLE CLEARANCE VOLUME ENGINE
Original Filed Jan. 7, 1935   6 Sheets-Sheet 4
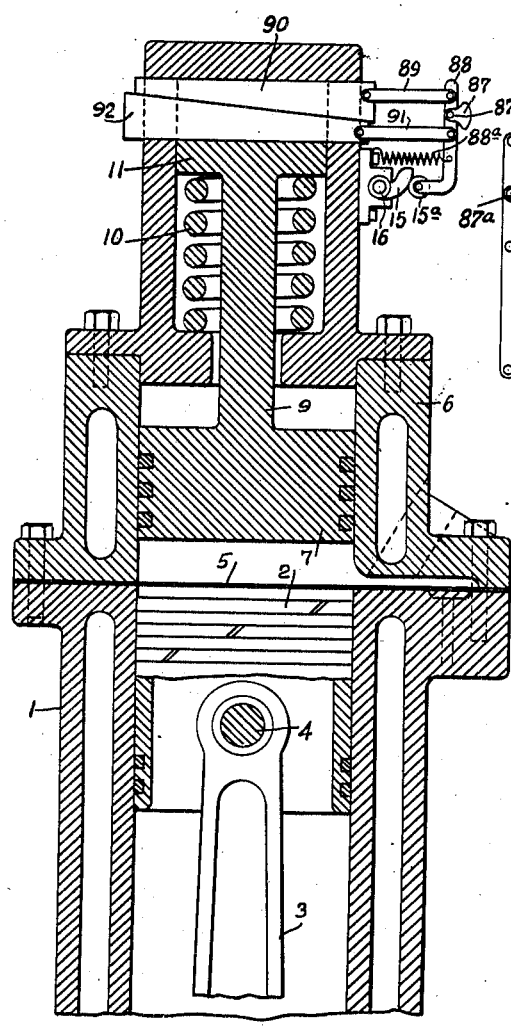
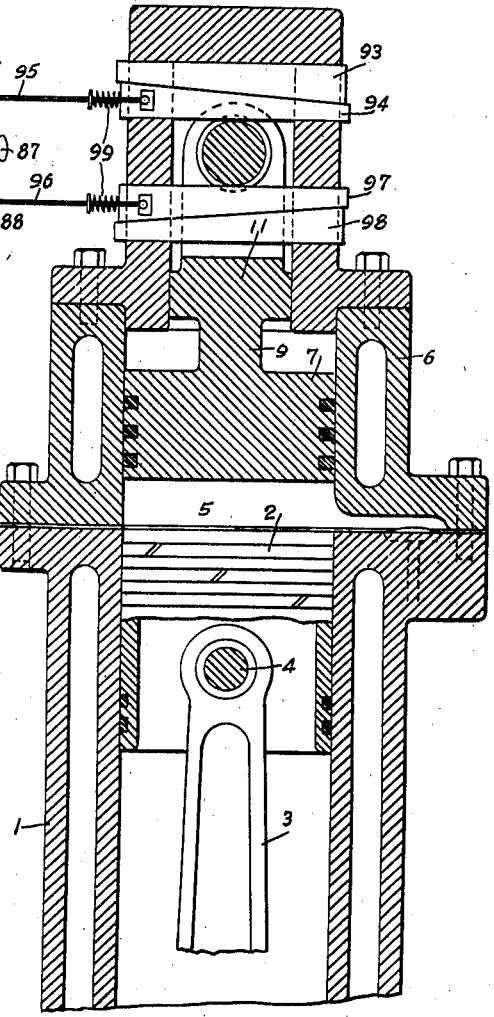
FRANK C. WAGNER, Inventor

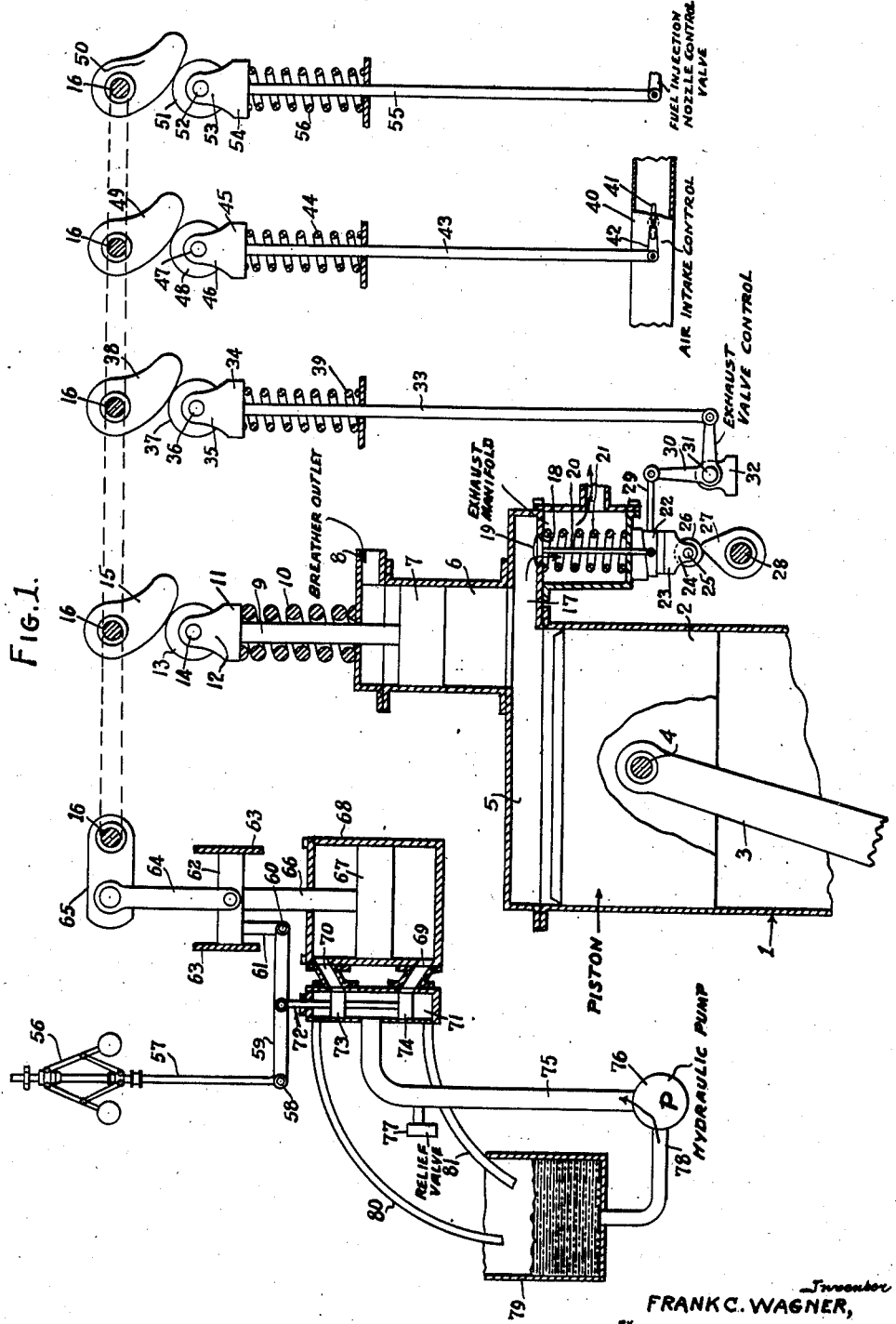

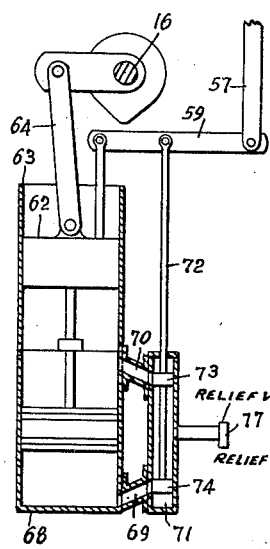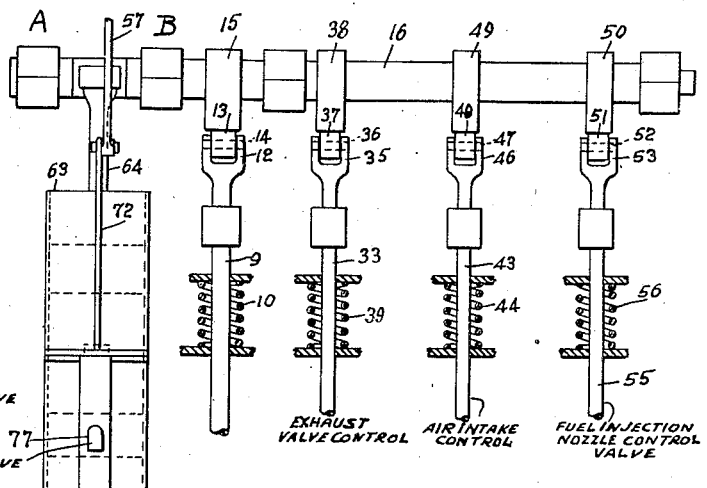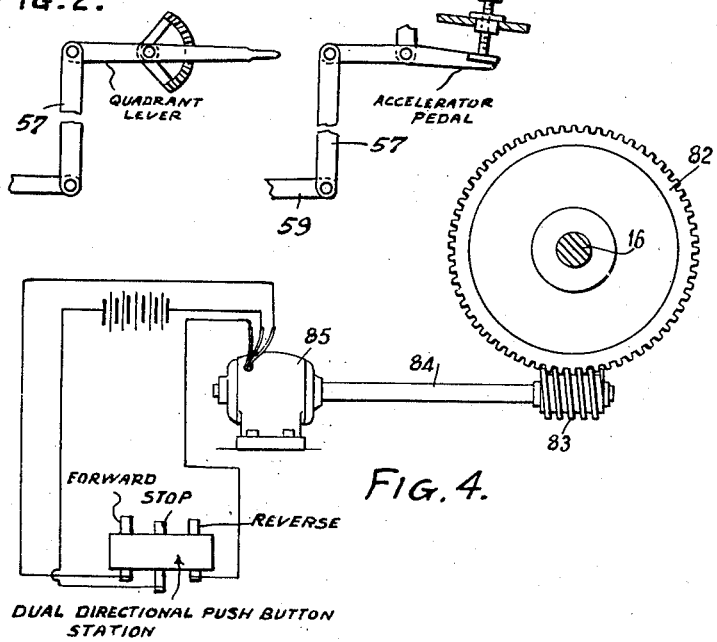

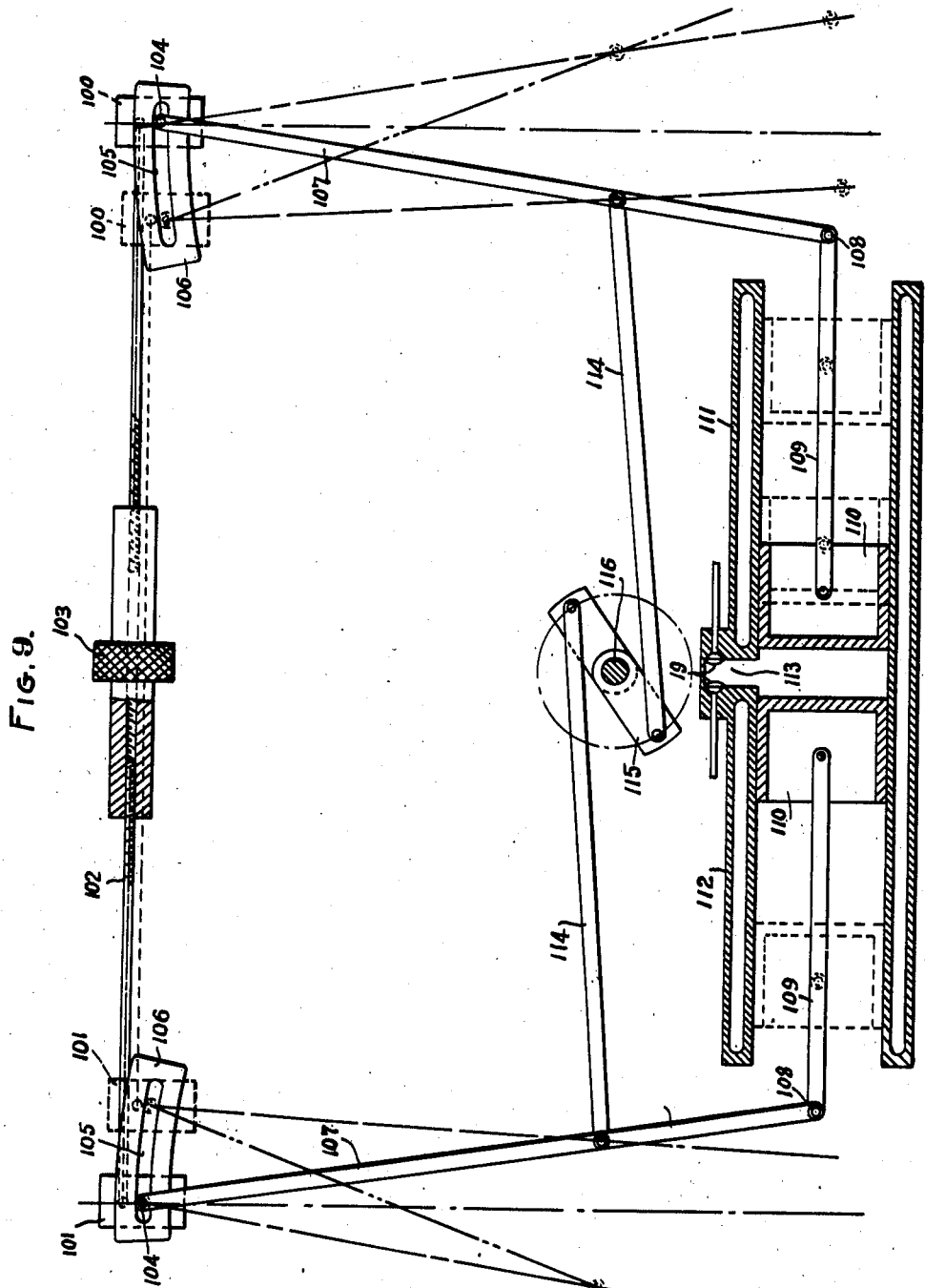

Jan. 3, 1939.   F. C. WAGNER   2,142,466
VARIABLE CLEARANCE VOLUME ENGINE
Original Filed Jan. 7, 1935   6 Sheets-Sheet 6
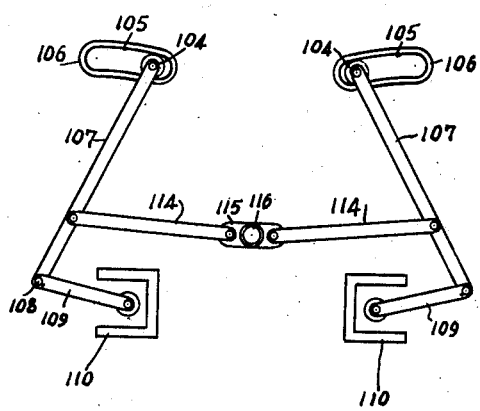
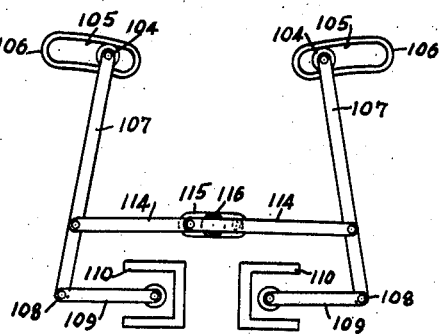
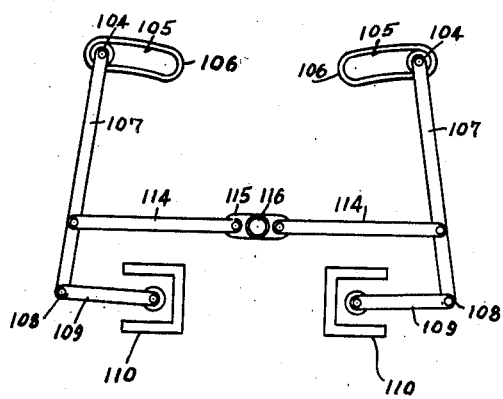
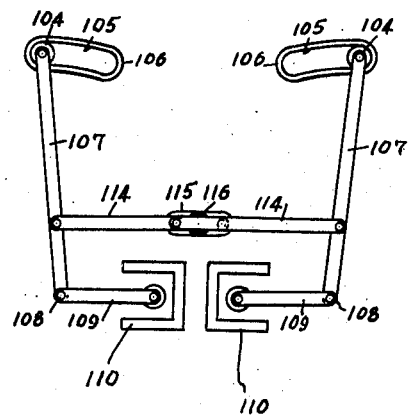
Inventor
FRANK C. WAGNER,
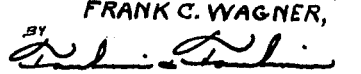
Attorneys Patented Jan. 3, 1939

2,142,466

UNITED STATES PATENT OFFICE 2,142,466

VARIABLE CLEARANCE VOLUME ENGINE

Frank C. Wagner, Corpus Christi, Tex., assignor of one-half to V. A. Bradley, Corpus Christi, Tex.

Application January 7, 1935, Serial No. 650
Renewed November 21, 1938

8 Claims. (Cl. 123—48)

My invention relates to internal combustion engines, and in particular to Diesel engines.

It is the object of my invention to provide in a constant volume engine, means for varying the clearance volume, and means for throttling the intake. It is my object to control the clearance volume for either constant compression pressure or constant compression temperature.

It is an object of the invention to provide in a Diesel engine a variable clearance volume in order to reduce the excess air for combustion at partial loads without impairing the temperature of compression as well as to increase the compression and expansion ratios.

It is a further object to provide a constant compression pressure regardless of varying load.

Another object of my invention is to provide a method of generating power by a Diesel engine so as to increase, at partial loads, the efficiency by reducing the clearance volume as the load is decreased, and vice-versa.

It is an object to provide means for obtaining an increased ratio of expansion at partial loads over the ratio of expansion at full load. It is an object to maintain a nearly constant compression pressure at varying partial loads.

Another object is to provide an engine of larger capacity than load requirements so that the normal operating load will be only a partial load with respect to the ultimate load capacity, thereby increasing the economy over the conventional engine.

Another object is to provide an internal combustion engine for operation at overload with equal economy to a standard engine at full load.

Another object is to reduce the air supplied to the engine in excess of that required for combustion by throttling the intake charge of injection types of engines at partial loads.

Another object is to reduce the exhaust gas losses by throttling the intake charge on injection types of engines at partial loads.

Another object is to provide linkage between the variable clearance volume means, the intake throttle, the fuel supply and the exhaust valve actuating linkage so that for each position of the variable clearance volume means there is a corresponding relative position of each of these so proportioned that the best economy and/or efficiency may be obtained at all loads.

Another object is to provide means for operating the variable clearance volume device under all conditions of pressure and temperatures usually encountered.

Another object is to provide a means for changing the exhaust valve timing (and cycle of operation if necessary) so as to obtain the full benefit of the increased expansion ratio at partial loads.

Another object is to include in the linkage, means to compensate for various climatic and any other conditions which might necessitate making a change of adjustment.

Referring to the drawings:

Figure 1 is a diagrammatic view of the essential parts involved in this invention, showing a single cylinder with its variable clearance volume apparatus, its adjustable exhaust, the control mechanism, the intake control and the fuel control.

Figure 2 is a diagrammatic detail view of a modified form in section of the control mechanism.

Figure 2a is a diagrammatic view illustrating the application of quadrant lever manual control means as applied to the structure shown in Figure 2.

Figure 2b is a diagrammatic view illustrating the application of accelerator pedal control means to the structure of Figure 2.

Figure 3 is a front elevation of the structure shown in Figure 2.

Figure 4 is a side elevation of the cam shaft worm wheel, and a two-directional pilot motor which may be substituted for the hydraulic cylinder of Figure 2 and Figure 3.

Figure 5 is a section through the main cylinder and the variable clearance volume cylinder, illustrating one method of controlling the variable clearance volume.

Figure 6 is a similar view showing another method of control, with a flexible cylinder head.

Figure 7 is a similar view showing the wedge form of control.

Figure 8 is a similar view showing another form of wedge control.

Figure 9 is a diagrammatic view showing the mechanism for effecting a variable volume cylinder when using opposing cylinders.

Figure 10 is a view showing the pistons in the opposed cylinder variable clearance engine at the extreme ends of the stroke in maximum clearance position with the fulcrums at their innermost positions.

Figure 11 is a similar view with the fulcrums further apart and the pistons approaching one another.

Figure 12 is a similar view with the fulcrums in the extreme position and the pistons in the extreme position.

Figure 13 is a similar view with the fulcrums in the extreme position and the pistons in their inner position for a minimum clearance position at the extreme ends of the stroke.

Referring to the drawings in detail, 1 is a cylinder having a piston 2 and a pitman 3 pivoted at 4. The interior of the cylinder, above the piston, is designated at 5. A supplementary variable clearance cylinder 6 communicates with the space 5. In this cylinder is a variable clearance piston 7. Above the piston is a breather outlet 8. The piston 7 is provided with a piston rod 9, surrounded by a helical spring 10 which serves to normally move the piston and piston rod upwardly by engagement with the head 11 on the piston rod 9. This head 11 is formed into a yoke 12 carrying a cam roller 13 on the axle 14, which is engaged by the cam 15 mounted on the cam shaft 16 (Figs. 1, 5 and 6).

In order to display in a single view the relationship of the parts, in Figure 1, the several parts have been turned in the diagram so they can be viewed. Although the cam shaft 16 is shown successively in section, nevertheless it is the same cam shaft used for operating the several mechanisms, as hereinafter described.

The upper end of the cylinder 1 communicates with an exhaust passageway 17 having an exhaust port 18 controlled by the exhaust valve 19 (Fig. 1). This exhaust valve has a valve stem 20, surrounded by the exhaust valve spring 21. The lower end of the valve stem 20 is provided with a wedge 22, which is engaged by the head 23 carrying a yoke 24 and axle 25, supporting a cam roller 26 which is actuated by the cam 27 and shaft 28.

The wedge 22 serves to vary the length of the stroke of the valve stem 20, therefor varying the opening of the exhaust valve. This wedge is connected by a pitman 29 to the bellcrank 30, which is pivoted at 31 on the block 32. This bellcrank is connected to the pitman 33, which terminates in a head 34 and yoke 35 carrying an axle 36 on which is supported a cam roller 37. This roller is engaged by the cam 38 mounted on the cam shaft 16. A spring 39 serves to maintain the cam roller against the cam.

The intake passageway 40 is controlled by a butterfly valve 41 connected to the lever 42, which in turn, is connected to the rod 43 that is normally moved upwardly by the spring 44. This rod 43 is provided with a head 45, yoke 46, axle 47 and a cam roller 48 engaging the cam 49 on the cam shaft 16. The cam shaft 16 also carries the cam 50, engaging the cam roller 51 supported on the axle 52 in the yoke 53 on the head 54. This head is carried on the rod 55. The roller is actuated against the cam by the spring 56. The rod 55 is connected to the valve control for controlling the amount of fuel that is admitted through the Diesel engine.

A governor 56 actuates the governor rod 57. This rod is pivoted at 58 to a floating lever 59. The floating lever 59 is pivoted at 60 to a compensating rod 61, which is attached to the crosshead 62 which travels in the crosshead guideway 63. This crosshead is connected by a connecting rod 64 pivotally to a crank arm 65, which is mounted on the cam shaft 16.

The other side of the crosshead 62 is connected by the piston rod 66 to the piston 67 operating in the hydraulic cylinder 68. This cylinder is provided with passageways and ports 69 and 70, which communicate with a cylinder 71 in which there operates a piston rod 72, pivoted at one end to the floating lever 59 and carrying a pair of spaced pistons 73 and 74. This assembly is known as the pilot valve. The cylinder 71 is connected by the hydraulic line 75 to a pump 76. The line 75 is equipped with a relief valve 77. The pump draws its hydraulic supply through the pipe 78 from the reservoir 79. The hydraulic supply is discharged through the pipes 80 and 81 from the cylinder 71.

Method of operation

The governor 56 operates the governor rod 57 and in doing so moves the lever 59, lowering the valve stem 72 and permitting the valve 73 to uncover the port 70, and permitting the valve 74 to uncover the port 69. Hydraulic pressure from the pump 76, passing through the pipe 75, will enter through the port 69 and lift the piston 67, while the fluid above the piston will make its exit through the port 70, line 80 to the reservoir 79. This results in the movement upwardly of the piston rod 66 and associated crosshead 62, with the connecting rod 64 and crank 65 for rotating the cam shaft 16 in order to adjust the position of the cams 15, 38, 49 and 50. The result is that according to the speed of the governor the clearance volume in the main cylinder is adjusted, the exhaust is adjusted, the intake for air is adjusted and the fuel admitted to the cylinder is adjusted.

In Figures 2 and 3 there is shown the hydraulic means for control of camshaft 16 with the four cams 15, 38, 49 and 50 assembled for control of the clearance volume, air intake, exhaust valve timing, and fuel injection respectively. The control rod 57 does not necessarily have to be connected to a governor as in Figure 1, but may be connected to a quadrant lever, accelerator pedal or other control means (Figures 2a, 2b). It is therefore shown in Figure 1 as broken on the upper end.

In Figure 4 there is shown a modification primarily for use in connection with marine engines. The cam shaft 16 in this instance carries cams 15, 38, 49 and 50, described above, but has mounted on one end thereof a worm wheel 82, which engages with the worm 83 on the shaft 84. This shaft is connected to the armature shaft of the pilot two directional motor 85.

The worm wheel 82 is mounted on camshaft 16, Figure 3, between bearings, and in place of the hydraulic mechanism parts 57—64—63—72—77 and 68. The camshaft position is now controlled from motor 85 by means of a duo-directional push button station (not shown) or any other suitable motor control means. This embodiment differs from that disclosed in Figs. 1, 2 and 3 only in the substitution of this electric motor driven means for the hydraulic means for controlling the position of the cam shaft 16.

Referring to Figures 5, 6, 7 and 8, there will be observed a variety of different mechanical ways of providing a variable clearance volume cylinder, the arrangement of the cam shaft accessories and controls being otherwise, in each of the embodiments, the same as is disclosed in Figs. 1, 2 and 3. For instance, in Figure 6 the head of the cylinder is a flexible disc 86. This diaphragm is connected to the piston rod 9 and is substituted for the usual piston 7.

Referring to Figure 7, instead of using a cam for varying the position of the variable clearance piston 7 in association with the cam roller, the following construction is employed: The pivot 87a on bracket 87 carries a pivot arm or lever 88. This lever is connected by the pitman 89 to a wedge 90. Another pitman 91 is pivotally connected to the lever 88 on the opposite side of the pivot 87a and pivoted to another wedge 92. The arm 88 is rocked on its pivot 87a by the cam 15 on the cam shaft 16 engaging with the roller 15a on the lever 88. This lever 88 moves against the resistance of the spring 88a.

In Figure 8 there is provided a stationary wedge 93 engaging a movable wedge 94, which is connected through the pitman 95 with the lever 88. A second wedge is connected by the pitman 96 to the lever 88. This second wedge is designated 97 and rides upon a stationary wedge 98. Snubber springs 99 are provided in connection with the movable wedges. These snubber springs are provided because the connections as indicated between the movable wedges 94 and 97 and the pitmen 95 and 96 are loose connections.

Turning to Figures 9 to 13, there will be seen a modification of a variable clearance engine with double opposed cylinders and opposed pistons, the cam shaft 116 in these embodiments corresponding to cam shaft 16 in the embodiment illustrated in Figs. 1, 2 and 3 and carrying cams corresponding to or identical with cams 15, 38, 49 and 50 shown in Figs. 1, 2 and 3. Fulcrums 100 and 101 are connected to an adjusting rod 102. This rod is adjusted, as hereinafter described, through the mechanism diagrammatically indicated at 103 so that the fulcrums can be brought closer together or farther away from each other at will. The adjusting rod 102 may take the form of any conventional extensible rod, such as a rod being composed of two sections having their ends reversely threaded and connected by appropriate nut or turnbuckle means, such as nut 103 (Fig. 9). These fulcrums comprising blocks are mounted by pins 104 to be adjusted to and from each other by the selective movement of the pins 104 in the slots 105 of the arcuate stationary guides 106. Mounted pivotally on the pins 104 are depending links 107, pivotally connected at 108 to the piston rod 109 of the respective pistons 110 operating in the cylinders 111 and 112. The cylinders are provided with a common exhaust port 113, controlled by the exhaust valves 19.

The links 107, sometimes called rocking rods, are each connected by a pitman 114 to the crank 115 on the crankshaft 116. Thus the extent to which the pistons 110, when they are reciprocated, will approach one another will depend upon the adjustment of the distance between their fulcrums 100 and 101, as indicated by the dotted lines in Figure 9. These various positions are indicated diagrammatically in Figures 10, 11, 12 and 13.

In connection with the exhaust valve timing, where the claims and description refer to "duration of the opening of said exhaust", it is also desired to include in the meaning "the point of opening". The wedge mechanism shown is merely a simple means of controlling the exhaust valve and it may be necessary to have a compound means, that is, a mechanism capable of controlling both the duration and the point of opening separately.

Whereas in the claims and description, the position of camshaft 16 is controlled "according to the speed of the engine", no doubt this phrase is used because of the assumption that there must be a governor, and the ordinary interpretation of a governor is to control speed. There may be used "load" rather than "speed" because the primary object of the invention is economy of Diesel or internal combustion engines at varying loads regardless of speed.

On small engines it would be possible to operate camshaft 16 manually by connecting manually operable lever and linkage means directly to the camshaft.

It will be understood that I desire to comprehend within my invention such modifications as come within the scope of my claims and my invention.

Having thus fully described my invention, what I claim as new and desire to secure by Letters Patent, is:

1. In a method of operating a Diesel engine, the combination of the steps of synchronously controlling according to the speed of the engine and the load, the charge of air, the charge of fuel independently of the charge of air, the exhaust valve timing and the clearance volume in the cylinder of the engine, whereby changes in load are synchronized with the foregoing changes so that at partial loads an increased ratio of expansion is obtained over the ratio of expansion at full load while maintaining the constant compression temperature.

2. In combination in a Diesel engine a cylinder and piston, means to variably control the clearance volume in the cylinder, said cylinder having an exhaust, means for variably controlling said exhaust, means for controlling said variable means according to the speed of the engine, means for controlling the air intake to the cylinder according to the speed of the engine, and means to control the amount of fuel injected into the cylinder independently of the air intake according to the speed of the engine.

3. In combination in a Diesel engine of a cylinder, a piston therein, means to permit the exhaust from the cylinder comprising an exhaust valve and exhaust port, means to vary the clearance volume of the cylinder, means to vary the intake of air through the cylinder, means to vary the intake of fuel injected into the cylinder independently of the air intake, a governor operated by said engine, and means connected to the governor to modify the clearance volume, the exhaust period, the quantity of intake air and the quantity of injected fuel.

4. The combination in a Diesel engine of a cylinder, a piston in the cylinder, means to vary the clearance volume in the cylinder comprising a piston, a piston rod and yielding means for withdrawing the piston and piston rod, a cam and cam shaft adapted to adjust the position of the piston and piston rod, means comprising an exhaust valve for controlling the exhaust from said cylinder, adjustable wedge means for adjusting the duration of the opening of said exhaust, means for operating said exhaust at intervals in synchronism with the operation of the engine, a second cam means on the cam shaft for adjusting said exhaust valve, wedge means, an air intake valve, a third cam means on said cam shaft for adjusting said valve, a fourth cam means on said cam shaft, and means adjusted thereby for adjusting the fuel injection means for said engine, and a governor operated by said engine adapted to adjust said cam shaft and said cams for controlling the clearance volume, exhaust, air intake and fuel injection of said Diesel engine.

5. The combination, in a Diesel engine, of a cylinder, a piston in the cylinder, fuel injection means communicating therewith, means to vary the clearance volume in the cylinder comprising a piston, a piston rod and yielding means for withdrawing the piston and piston rod, a rotatably adjustable auxiliary cam shaft, a cam on said auxiliary cam shaft adapted to adjust the position of the piston and piston rod, means comprising an exhaust valve for controlling the exhaust from said cylinder, adjustable wedge means cooperating with said valve to vary the effective length thereof for adjusting the duration of the opening of said exhaust valve, cam and cam shaft means for operating said exhaust valve at intervals in synchronism with the operation of the engine, a second cam means on the auxiliary cam shaft for adjusting said adjustable wedge means, an air intake valve, a third cam means on said auxiliary cam shaft for adjusting said air intake valve, a fourth cam means on said auxiliary cam shaft, means adjusted by said fourth cam means for adjusting the fuel injection means for said engine, a governor operated by said engine adapted to adjust said auxiliary cam shaft and said cams for controlling the clearance volume, exhaust, air intake and fuel injection of said Diesel engine, and hydraulically operated means associated with said cam shaft and said governor for effecting the adjustment of said cam shaft.

6. The combination, in a Diesel engine, of fuel injection means, a cylinder connected to said air intake valve and said fuel injection means, a piston in the cylinder, means to vary the clearance volume in the cylinder comprising a piston, a piston rod and yielding means for withdrawing the piston and piston rod, a rotatably adjustable auxiliary cam shaft having thereon a cam adapted to adjust the position of the piston and piston rod, means comprising an exhaust valve for controlling the exhaust from said cylinder, adjustable wedge means for varying the effective length of said exhaust valve for adjusting the duration of the opening of said exhaust valve, cam and cam shaft means for operating said exhaust valve at intervals in synchronism with the operation of the engine, a second cam means on the auxiliary cam shaft for adjusting said exhaust valve wedge means, an air intake valve, a third cam means on said cam shaft for adjusting said air intake valve, a fourth cam means on said cam shaft, means adjusted by said fourth cam means for adjusting the fuel injection means for said engine, a governor operated by said engine adapted to adjust said cam shaft and said cams for controlling the clearance volume, exhaust, air intake and fuel injection of said Diesel engine, and hydraulically operated means associated with said cam shaft and said governor for effecting the adjustment of said cam shaft, said means comprising a hydraulic cylinder, a piston and piston rod for adjusting said cam shaft, and a hydraulically controlled valve for controlling the admission and exit of hydraulic fluid for moving said piston in said cylinder, said control valve being connected to said governor and to compensating linkage from said hydraulic piston.

7. In a Diesel engine having a cam shaft, clearance volume regulating means, fuel injector control means, exhaust valve means, and air intake control means; a rotatably adjustable shaft, a plurality of cams on said shaft, means associated with one of said cams for adjusting said clearance volume regulating means, means associated with a second cam for adjusting said fuel injector control valve means, means associated with a third cam for adjusting said air intake control means, means associated with a fourth cam for said exhaust valve means, and including a wedge mechanism for changing the effective length of said valve means, and engine speed responsive means for concurrently controlling the adjustment of said clearance volume regulating means, said injector control valve means, said air intake control means and said exhaust valve control means, by rotary adjustment of said shaft and supported cams.

8. In a Diesel engine having a cam shaft, clearance volume regulating means, fuel injector control means, exhaust valve means, and air intake control means; a rotatably adjustable shaft, a plurality of cams on said shaft, means associated with one of said cams for adjusting said clearance volume regulating means, means associated with a second cam for adjusting said fuel injector control valve means, means associated with a third cam for adjusting said air intake control means, means associated with a fourth cam for said exhaust valve means, and including a wedge mechanism for changing the effective length of said valve means, and engine speed responsive means for concurrently controlling the adjustment of said clearance volume regulating means, said injector control valve means, said air intake control means and said exhaust valve control means, by rotary adjustment of said shaft and supported cams, said last-named means including a centrifugal governor responsive to the speed of the Diesel engine, a crank arm on said shaft, and hydraulic means operatively connecting said centrifugal governor to said crank arm.

FRANK C. WAGNER.